US010313917B2

(12) United States Patent
Halabian et al.

(10) Patent No.: US 10,313,917 B2
(45) Date of Patent: Jun. 4, 2019

(54) UE LOAD-SENSITIVE FRONT-HAUL CONTROLLER

(71) Applicants: Hassan Halabian, Kanata (CA); Peter Ashwood-Smith, Gatineau (CA)

(72) Inventors: Hassan Halabian, Kanata (CA); Peter Ashwood-Smith, Gatineau (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/494,636

(22) Filed: Apr. 24, 2017

(65) Prior Publication Data

US 2018/0310199 A1    Oct. 25, 2018

(51) Int. Cl.
*H04W 28/02*    (2009.01)

(52) U.S. Cl.
CPC ... *H04W 28/0252* (2013.01); *H04W 28/0289* (2013.01)

(58) Field of Classification Search
CPC ......... H04W 28/0252; H04W 28/0289; H04W 28/16; H04W 24/02; H04W 84/12; H04W 88/085; H04W 16/02
See application file for complete search history.

(56) References Cited

U.S. PATENT DOCUMENTS

| | | | |
|---|---|---|---|
| 2014/0003297 A1* | 1/2014 | Uusitalo | H04W 28/0231 370/259 |
| 2016/0105236 A1 | 4/2016 | Zhang et al. | |
| 2016/0286413 A1 | 9/2016 | Ling | |
| 2017/0026982 A1* | 1/2017 | Koskinen | H04W 72/12 |
| 2017/0086111 A1* | 3/2017 | Vrzic | H04W 36/023 |
| 2017/0238361 A1* | 8/2017 | Pawar | H04W 88/085 455/561 |
| 2017/0250777 A1* | 8/2017 | Sarashina | H04B 10/25754 |
| 2017/0288695 A1* | 10/2017 | Feng | H04B 1/66 |
| 2018/0034669 A1* | 2/2018 | Barbieri | H04L 25/02 |
| 2018/0041327 A1* | 2/2018 | Wolff | H04L 5/1492 |

FOREIGN PATENT DOCUMENTS

WO    2016039839 A1    3/2016

\* cited by examiner

*Primary Examiner* — Kibrom T Hailu (57) ABSTRACT

A front-haul controller for a network coupling a BBU and an RRH that exchanges RF analog signals with a supported UE. The network comprises a plurality of nodes coupled by variable bit-rate network communications links. The BBU exchanges packets of frequency-domain samples with the RRH along the network. The front-haul controller monitors information about wireless spectrum occupancy at the RRH and at least one spectrum occupancy threshold and varies a bit-rate of the network link in accordance therewith. The front-haul controller can proactively adjust the bit-rate and/or the threshold during periods associated with at least one event that may impact the spectrum occupancy. The network link can be a FlexE, SONET, DWDM, LAG and/or ECMP link.

23 Claims, 8 Drawing Sheets

UE LOAD-SENSITIVE FRONT-HAUL CONTROLLER

RELATED APPLICATIONS

Not Applicable.

TECHNICAL FIELD

The present disclosure relates to radio access network (RAN) architecture and in particular to a front-haul controller that is sensitive to a density or load of user equipment (UE) supported by a remote radio head (RRH) in the front-haul.

BACKGROUND

In wireless communication networks, mobile communication devices or UEs communicate in a point-to-point fashion with a base terminal station (BTS) by the exchange of radio signals. Because the BTS is coupled by a core back-haul network to other BTSes servicing other UEs as well as the internet, the UE is capable of voice and/or data communications with other UEs and of accessing the internet.

In 1G and 2G technologies, the BTS was typically sited at or near its associated antenna tower. The BTS generates an analog RF signal and propagates the RF signal by RF cable pair to the antenna.

Figure 1:
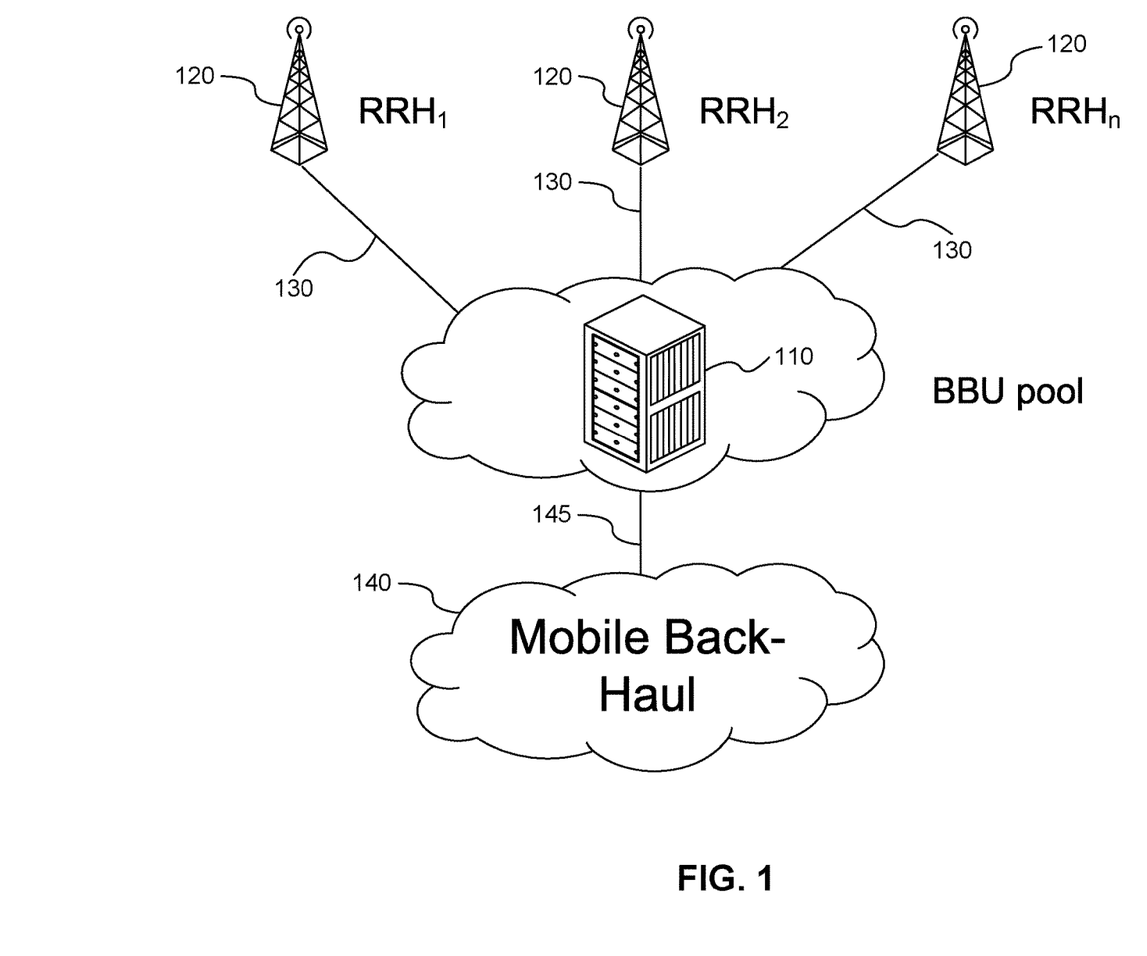
FIG. 1 is a block diagram of an example of a C-RAN architecture comprising at least one BBU and point-to-point front-haul links to at least one RRH.

Starting with 3G networks, a decoupled front-haul concept was introduced, which is shown in an example block diagram in FIG. 1, where a portion of the functionality for a plurality of BTSes is co-located at a remote distributed front-haul processor or baseband unit (BBU) 110. The centralization of some BTS functions in a BBU 110 or BBU pool allows economies of scale in some of the BTS processing and lowers transmission losses by the communication of baseband signals, between the BBU 110 and a wireless transceiver or remote radio head (RRH) 120 along a point-to-point optical fiber front-haul link 130 between them, which the RRH 120 converts to RF time-domain signals for transmission to the UE. The BBU 110 or BBU pool may be coupled to a mobile back-haul network 140 by one or more cables or fibers 145.

More recently, the decoupled front-haul concept has evolved into a cloud-RAN (C-RAN) architecture that takes advantage of developments in wireless, optical and IT technologies, including without limitation, common packet radio interface (CPRI) protocols across dense wavelength division multiplexing (DWDM) optical communications front-haul links 130, to interconnect the BBU 110 and the RRH 120. The C-RAN architecture also takes advantage of concepts drawn from software-defined networking (SDN) and network function virtualization (NFV). The C-RAN architecture permits low-complexity RRH 120 implementation, which is advantageous, especially for small cells.

Figure 2:
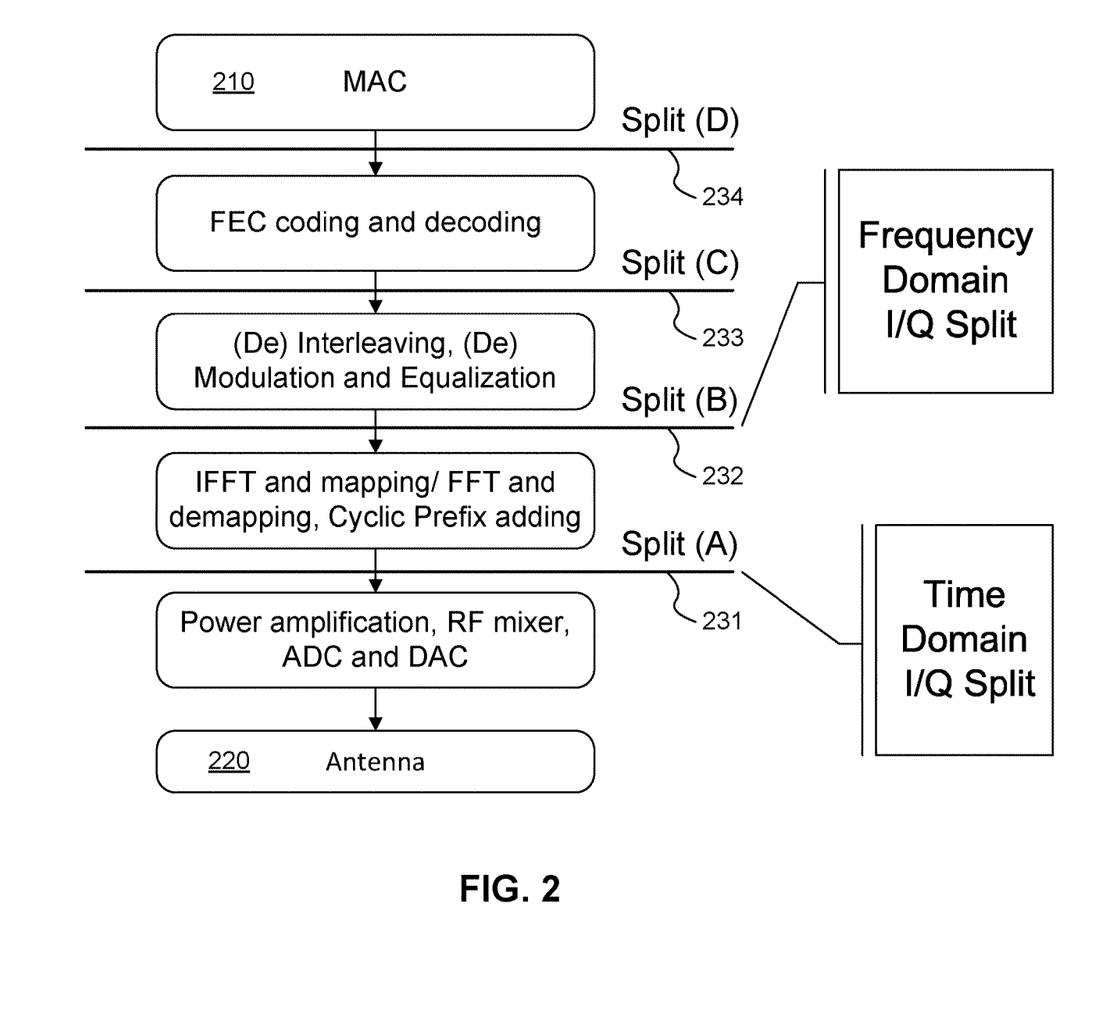
FIG. 2 is a block diagram showing example splits of BTS functionality as between the BBU and the RRH(s)

FIG. 2 shows an example of processing of BTS functionality between the link layer or media access control (MAC) 210 of a core network and the antenna 220 of an RRH 120. Such functionality can be split between the BBU 110 and the RRH 120 in a number of fashions or splits 231-234, respectively designated (A) through (D).

Conventionally, the C-RAN concept contemplates a time domain I/Q split, shown as split (A) 231, in which the front-haul links 130 between the BBU 110 and the RRH 120 convey time domain signals. The time domain I/Q split 231 is fully centralized, so that the RRH 120 is only assigned a few functions. In some cases, the RRH 120 functions may include power amplification and RF mixing of signals between baseband and RF. In some cases, the BBU 110 may digitize signals so that the front-haul links 130 convey digital signals such as point-to-point continuous bit-rate (CBR) signals using CPRI over an Ethernet or radio over Ethernet (ROE). In such cases, the RRH 120 functions may also include digital-to-analog conversion (DAC) functions on the transmit side and analog-to-digital conversion (ADC) functions on the receive side.

Such CBR signals consume considerable front-haul capacity, on the order of 1 Gbps per 20 MHz channel, irrespective of the UE load borne by the RRH 120 in the uplink direction and by the BBU 110 in the downlink direction. That is, the antenna 220 of the RRH 120 is always transmitting, even if the RRH 120 has a low density of UEs that it is supporting, that is, a low UE load.

Moreover, the front-haul capacity scales substantially linearly with a number of factors, including without limitation, the number of antenna ports, the number of sectors, the sampling rate, the number of carriers, the front-haul overhead, the front-haul compression factor and the I/Q bit-width. Furthermore, the CBR signals are constrained by latency factors, including a 3 ms hybrid automatic repeat request (HARQ) deadline for each sub-frame.

If the split in the C-RAN architecture is adjusted from a time domain I/Q split (A) 231 to a frequency domain I/Q split (B) 232, the front-haul links 130 can convey digital frequency-domain samples between the BBU 110 and the RRH 120. Such a modification is less centralized in that the RRH 120 is assigned additional functionality to locally handle all broadcast channel data and reference signals. Such functionality may include, without limitation, performing inverse fast Fourier transformation (IFFT) and mapping to convert frequency-domain samples to time-domain signals on the transmit side and fast Fourier transformation (FFT) and de-mapping to convert time-domain signals to frequency-domain samples on the receive side. Such an approach may impose a minor increase in front-haul overhead, since the front-haul would maintain a map identifying which I/Q sample is associated with a given sub-carrier of the analog RF signal.

The slight decrease in centralization may be justified since adjusting the split in this manner reduces the bandwidth of the signals along the front-haul links 130 considerably, on the order of as much as 50%. By way of non-limiting example, for each 20 MHz channel, there is about a 42% saving related to decreased number of I/Q samples in the frequency domain. Additionally, if cyclic prefix (CP) I/Q samples are not sent along the front-haul link, but added at the RRH 120, an additional 7% saving may be realized. Furthermore, such an adjustment in the split does not substantially affect the latency constraints relative to the conventional time domain I/Q split (A) 231. Still further, the physical broadcast channel (PBCH) and reference symbols can be omitted.

Additionally, it has been recognized that if a particular sub-carrier is not being used, in a frequency domain I/Q split (B) 232, the frequency sample(s) associated with the sub-carrier can be compressed or even discarded, with the result that the bandwidth across a front-haul link 130 between the BBU 110 and an RRH 120 may vary to some extent with the UE load borne by the RRH 120 in the uplink direction and by the BBU 110 in the downlink direction.

Other less-centralized splits include split (C) 233, in which forward error correction (FEC) and multiple-in multiple-out (MIMO) antenna processing (joint decoding, not joint detection) is maintained in the BBU 110, while the RRH 120 is assigned functions related to (de)interleaving, (de)modulation and equalization. In this split, front-haul capacity is dependent upon factors including without limitation, the signal plus interference to noise ratio (SINR), channel rank due to HARQ, the link adaptation algorithm employed and the UE load.

Finally, split (D) 234 assigns all of the BTS functionality at the RRH 120, removing all centralization and substantially reverting to the 1G/2G decentralized concept where the BTS is housed at the antenna site. In this split, front-haul capacity is tied to the user throughput and is dependent on factors including without limitation, the radio link quality and the UE load.

BRIEF DESCRIPTION OF THE DRAWINGS

Example embodiments of the present disclosure will now be described by reference to the following figures, in which identical reference numerals in different figures indicate identical elements and in which.

For purposes of explanation and not limitation, specific details are set forth in order to provide a thorough understanding. In some instances, detailed descriptions of well-known devices, circuits and methods are omitted so as not to obscure the description with unnecessary detail.

SUMMARY

In an example, there is disclosed a front-haul controller for a network comprising a plurality of nodes coupled by at least one variable bit-rate network communication link, the network coupling at least one front-haul processor and at least one wireless transceiver that exchanges RF analog signals with at least one supported wireless device. The front-haul processor exchanges packets of frequency-domain samples with the at least one transceiver along the network. The controller monitors information about wireless spectrum occupancy at the at least one transceiver and at least one spectrum occupancy threshold and varies a bit-rate of at least one of the network links in accordance with this information.

The network links may be flexible Ethernet (FlexE), synchronous optical networking (SONET), DWDM variable bit-rate, Link Aggregation (LAG) and/or Equal Cost Multi Path (ECMP) links.

The front-haul controller may proactively adjust the bit-rate and/or the threshold during at least one period associated with at least one predicted event that may impact the spectrum occupancy.

The information may include statistical multiplexing data. The spectrum occupancy information may be related to packets across the network link associated with the transceiver, a density of devices supported by the transceiver and/or the topology and/or loading of the nodes coupled by the network link.

The front-haul controller may form part of the front-haul processor. The front-haul processor may be a BBU. The front-haul processor may be coupled to and exchange packets with a plurality of transceivers. The transceiver may be an RRH located proximate to an RF antenna. The wireless device may be a UE. The wireless device may be supported by a plurality of transceivers.

The network may support communications unrelated to supporting exchange of front-haul information for communication with the wireless device between the front-haul processor and the transceiver. The node may be a point of presence (PoP) onto which network functionality is downloaded to form a virtual network function (VNF). The network functionality may support exchange of front-haul information for communication with the wireless device between the front-haul processor and the transceiver.

The packets may have a variable length. The packets may omit at least one sample associated with at least one subcarrier that is not used by the transceiver to support the wireless device.

In an example, there is disclosed a method of controlling the exchange of front-haul information comprising packets of frequency-domain samples between at least one front-haul processor and at least one wireless transceiver that exchanges at least one RF analog signal with at least one supported wireless device across a network. The network comprises a plurality of nodes coupled by at least one variable bit-rate network communication link. The method comprises monitoring information about wireless spectrum occupancy at the at least one transceiver and varying a bit-rate of the network link in accordance therewith.

The action of monitoring can comprise proactively adjusting at least one of the bit-rate and the threshold during at least one period associated with at least one predicted event that may impact the spectrum occupancy.

In an example, there is disclosed a node having a processor and a memory containing a front-haul controller software module for execution by the processor. The software module causes the node to control the exchange of front-haul information comprising packets of frequency-domain samples between at least one front-haul processor and at least one wireless transceiver that exchanges at least one RF analog signal with at least one supported wireless device across a network. The network comprises a plurality of nodes coupled by at least one variable bit-rate network communications link. The software module causes the node to monitor information about wireless spectrum occupancy at the at least one transceiver and vary a bit-rate of the network link in accordance therewith.

The software module can cause the node to proactively adjust at least one of the bit-rate and the threshold during at least one period associated with at least one predicted event that may impact the spectrum occupancy.

DESCRIPTION

Because in a frequency domain I/Q split (B) 232, the front-haul link 130 between a BBU 110 and an RRH 120 comprise frequency-domain samples, if a given sub-carrier of the RF analog signal being transmitted or received by the RRH 120 is not being used, for example, because the density of UEs supported by the RRH 120 is low, the frequency-domain sample(s) corresponding to such unused sub-carrier can be omitted from the samples sent along the front-haul link 130. It follows, then, that the load borne the front-haul link 130 may vary in accordance with the UE load. Thus, the bit traffic that passes along the front-haul link 130 also may vary in accordance with the UE load.

Figure 3:
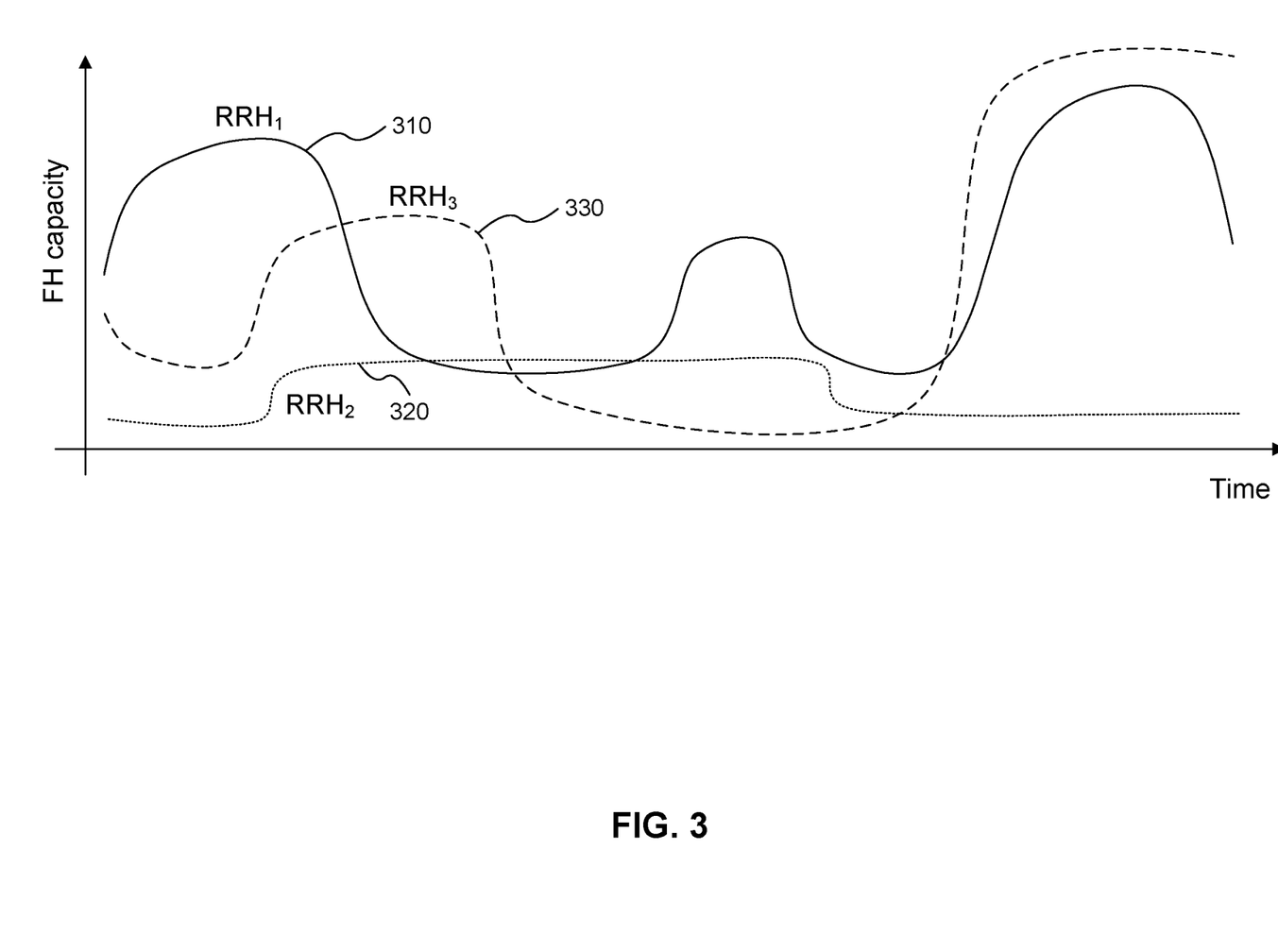
FIG. 3 is a graph of example front-haul capacity demands of the RRH(s) of FIG. 1 as a function of time in a frequency domain I/Q split.

FIG. 3 is a graph of example of the load on front-haul capacity 310, 320, 330 that is drawn by each RRH 120 of FIG. 1 as a function of time, when a frequency-domain I/Q split (B) 232 is employed and samples corresponding to unused sub-carriers are not sent along the front-haul link 130. As may be seen, the capacity demands 310, 320, 330 may each vary significantly as a function of time. Further, the variation in capacity demands 310 of a given RRH 120 may be relatively independent of the capacity demands 320, 330 of other RRHs 120. The variability and lack of correlation of the capacity demands 310, 320, 330 of each RRH 120 suggests that some sort of statistical multiplexing may provide certain gains.

Figure 4:
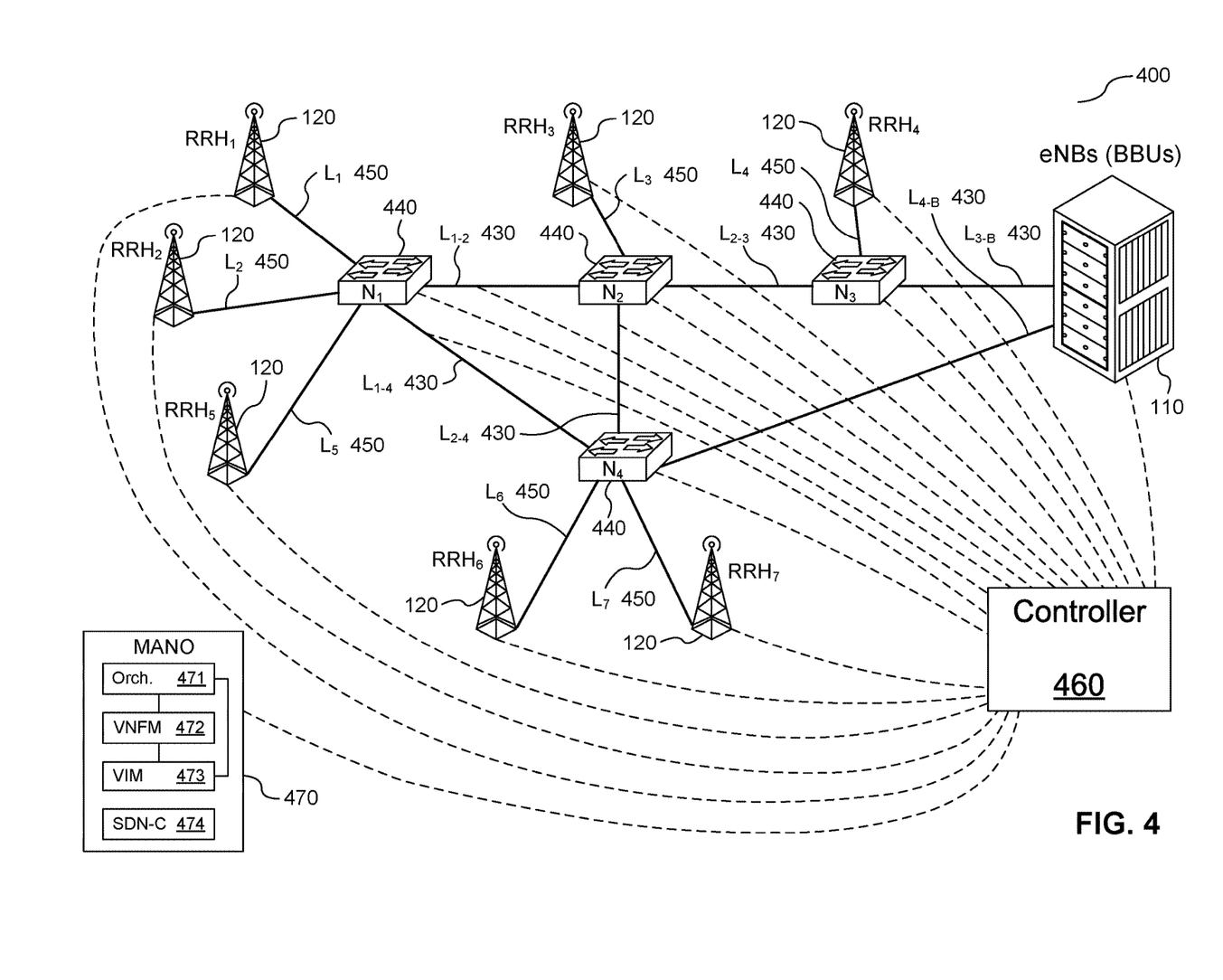
FIG. 4 is a block diagram showing a packetized network coupling at least one BBU to at least one RRH to take advantage of statistical multiplexing gains according to an example.

FIG. 4 is a block diagram showing a modification of the front-haul concept of FIG. 1 to support and take advantage of statistical multiplexing gains. In the figure, the front-haul processor, which may be the BBU 110, is coupled to the RRHs 120 by a front-haul network shown generally at 400 that replaces the front-haul link(s) 130. A portion of the front-haul network 400 that couples an RRH 120 and the BBU 110 is generically referred to in this disclosure, as the front-haul for such RRH 120. Each of the RRHs 120 supports zero or more UEs. In some examples, a given UE may be supported by more than one RRH 120, such as, by way of non-limiting example, during hand-off or in a MIMO antenna deployment.

The front-haul network 400 comprises at least one variable bit-rate network communication link $L_{x-y}$ 430 that couples a pair of nodes $N_x$ and $N_y$ 440. One of the nodes 440 coupled by a network link $L_{x-B}$ 430 may be the BBU 110. Each of the RRHs $RRH_{\#}$ 120 is coupled to one of the nodes $N_x$ 440 in the front-haul network 400 by a terminal link $L_{\#}$ 450.

The nodes 440 exchange packets of data along the network links 430. In some examples, the packets contain frequency-domain samples of front-haul information for communication between the RRH 120 and a UE supported thereby. In some examples, the front-haul information comprises frequency-domain I/Q samples. In some examples, the frequency-domain I/Q samples relates to sub-carrier(s) used by the RRH 120 in communication with the supported UE(s). In some examples, the packets omit at least one sample associated with at least one subcarrier that is not used by the RRH 120 in communication with the supported UE(s). In some examples, the packets exchanged by the nodes 440 are variable-length packets.

Each of the network links 430 is capable of having its bit-rate capacity varied. In some examples, a network link 430 may be a flexible Ethernet (FlexE) link. FlexE provides a mechanism for supporting a variety of Ethernet MAC rates, which are not necessarily supported by the existing physical layer (PHY) rates, on top of the existing Ethernet PHY rates by using Ethernet bonding, sub-rate support and/or channelization. Current versions of FlexE support one or more bonded 100 Gbps PHY channels and MAC rates of 10, 40 and m×25 Gbps.

In some examples, the variable bit-rate capability of the network links 430 may be provided by a synchronous optical networking (SONET), DWDM link, link aggregation (LAG) and/or equal cost multi path (ECMP) link. LAG and/or ECMP links allow for increases in capacity between two network devices by using parallel links and spreading traffic over them.

In some examples, one or more of the terminal links 450 coupling an RRH 120 to a node 440 may also have a variable bit-rate capability.

In some examples, a node 440 may be coupled to a plurality of other nodes 440 by a plurality of network links 430. In some examples, a node 440 may be coupled to a plurality of RRHs 120 by corresponding terminal links 450.

In some examples, the nodes 440 and/or the BBH 110 may be points-of-presence (PoPs) in an NVF environment onto which network functionality may be downloaded from a cloud resource to instantiate a virtual network function (VNF). The network functionality may include software that supports the front-haul implementation discussed herein. In some examples, the network functionality may support other functionality in addition to the front-haul support discussed herein. In some examples, the PoP may be instantiated with a plurality of VNFs to support other functionality beyond the front-haul support discussed herein.

In some examples, the NFV environment is supported by a management and orchestration (MANO) module 470. The MANO module 470 may comprise an orchestrator 471, a VNF manager (VNFM) 472 and/or a virtual infrastructure manager (VIM) 473. The orchestrator 471, in conjunction with the VNFM 472 and VIM 473, is responsible for performing life cycle management (LCM) of network slices, in which one or more PoPs are instantiated with those VNFs that provide a dynamic service level capability for a particular service. The use of network slices permits only those VNFs that are appropriated to be instantiated, and only as and when appropriate.

The orchestrator 471 identifies suitable PoP(s) on which to host the VNF(s) belong to a network slice instance and passes these locations onto the VNFM 472. The VNFM 473 performs LCM of these VNFs. In some examples, the orchestrator 662 provides instructions to trigger LCM actions on the VNF(s). The VIM 473 manages the pooled resources of the VNF. In some examples, the orchestrator 471 provides VNF resource demands to the VIM 473 and the VIM 473 provisions the demanded resources and returns the resource locations to the orchestrator 471.

In some examples, the instantiation of VNFs in PoPs may be used in an SDN environment in which the topology of the nodes 440 and network links 430 in the front-haul network 400 may be dynamically and quickly reconfigured. In some examples, the SDN environment may be managed by an SDN controller (SDN-C) 474, which may form part of the MANO module 470. The SDN-C 474 is responsible for determining and enforcing the flow-level forwarding rules on SDN-enabled routers in the front-haul network 400. In some examples, the SDN-C 474 may support communications with intermediate networking gear in the front-haul network 400, including switches, routers, DWDM equipment and/or optical transport network (OTN) equipment.

Figure 5A:
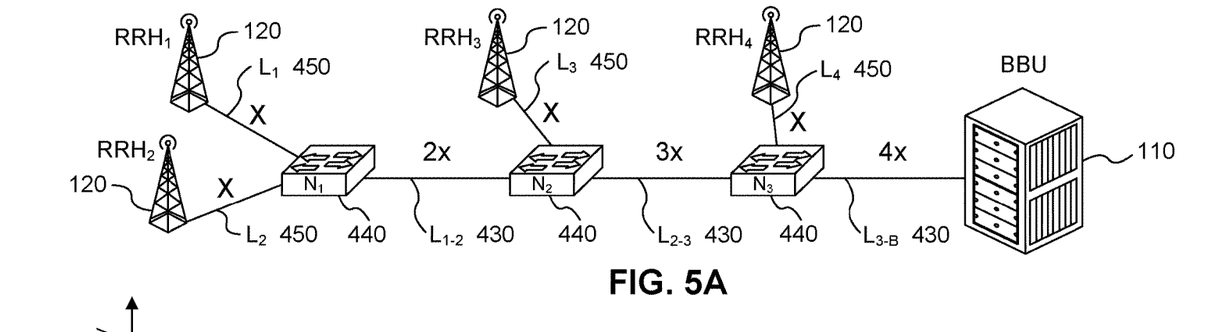
FIG. 5A is a block diagram of a portion of the network of FIG. 4, showing notional loading on the network links thereof.

Interposing the network 400 between the BBH 110 and the RRHs 120 facilitates taking advantage of statistical multiplexing gains in the front-haul. This is illustrated in FIG. 5A, in which an example subset of RRHs 120 (RRH$_1$, RRH$_2$, RRH$_3$, RRH$_4$), network links 430 (L$_{1-2}$, L$_{2-3}$, L$_{3-B}$), nodes 440 (N$_1$, N$_2$, N$_3$) and terminal links 450 (L$_1$, L$_2$, L$_3$, L$_4$) are shown.

Assuming, for the sake of the illustration, that each of the RRHs 120 imposes a load X 510, 520, 540, 550 on each of terminal links L$_1$, L$_2$, L$_4$, L$_5$ 450, corresponding respectively to RRH$_1$, RRH$_2$, RRH$_4$ and RRH$_5$, on the front-haul capacity of the front-haul network 400, it might be assumed that the load on network link L$_{1-2}$ 430 would be 2×, the load on network link L$_{2-3}$ 430 would be 3× and the load on network link L$_{3-B}$ 430 would be 4×.

Figure 5B:
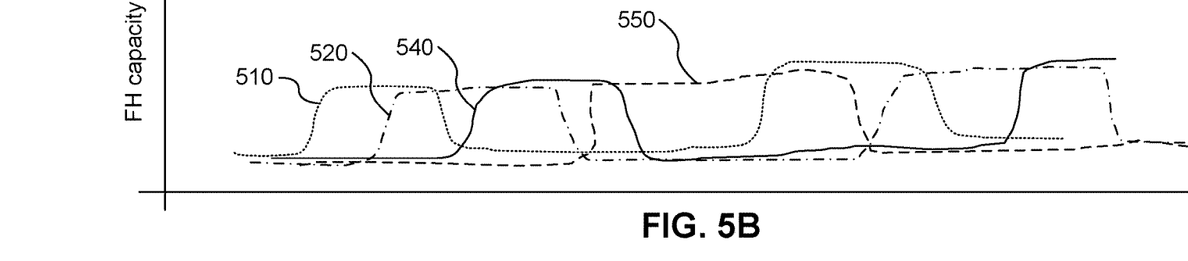
FIG. 5B is a graph of example front-haul capacity demands of the RRHs of FIG. 5A as a function of time.
Figure 5C:
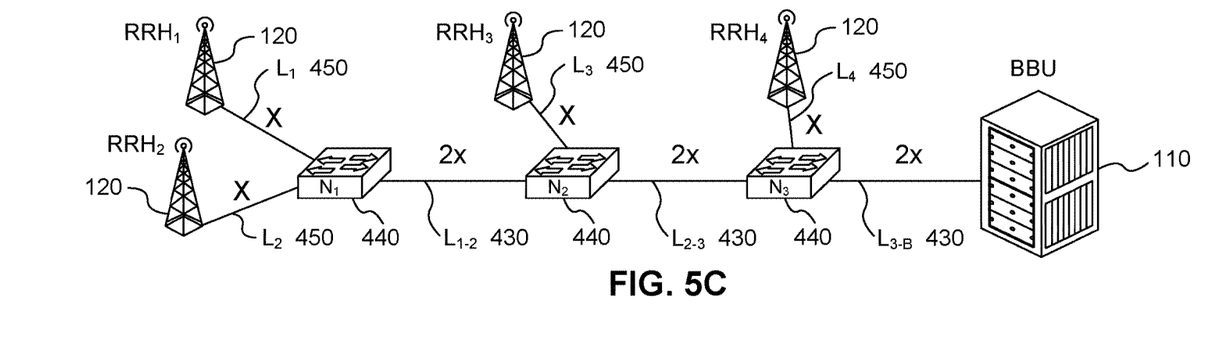
FIG. 5C is the block diagram of the network portion of FIG. 5A showing loading on the network links thereof, taking into account available statistical multiplexing gains according to an example.

However, when the actual loads 510, 520, 540, 550 are plotted as a function of time, as in FIG. 5B, it may be seen that, as a result of the variability over time of the loads 510, 520, 540, 550 and the lack of correlation between them, the load on network link L$_{2-3}$ 430 and on network link L$_{3-B}$ 430 both remain at 2×, reflecting a gain due to statistical multiplexing. This is illustrated in FIG. 5C.

Thus it will be appreciated that as the UE load for various RRHs 120 varies over time, the load imposed on the network links 430 between nodes 440 in the front-haul network 400 will also vary. The use of variable-bit rate network links 430 facilitate ensuring that sufficient front-haul capacity is available across any network link 430 to support the demands thereon imposed by the various RRHs 120.

By way of non-limiting example, where one or more of the network links 430 are FlexE links that collectively provide 100 Gbps throughput, one or more of the network links 430 may be dynamically assigned a MAC rate capacity that is an integer multiple (less than 10) of 10 Gbps. If such network link 430 has, at a given point of time, an increased load such that its then-assigned capacity is insufficient, an additional 10 Gbps (or integer multiple thereof) could be diverted reactively from another of such FlexE network links 430 and allocated to it. In addition to providing capacity efficiency, improved queueing delay performance may be obtained.

By the same token, if the network link 430 no longer demands such increased capacity, it could give up 10 Gbps (or integer multiple thereof) that could then be re-allocated to another FlexE network link 430.

In other words, the FlexE MAC rates of different network links 430 may be reactively or proactively adapted to follow the dynamics of the front-haul network 400, without having to support multiple PHY rates over multiple Ethernet links for each network link 430.

It will also be appreciated that in some instances, the change in load imposed on the front-haul capacity of a given network link 430 may be predictable in that it is responsive to a temporal event. By way of non-limiting example, if a given RRH 120 is geographically located so as to be proximate to and supportive of an downtown commercial region, one could reliably predict that the capacity called for by a network link 430 in the front-haul of such RRH 120 might increase at or around 9:00 am and stay relatively high until on or about 5:00 pm every Monday through Friday and remain relatively low from Friday at or around 5:00 pm every Friday, through Saturday and Sunday, until at or around 9:00 am the following Monday. Thus, it may be appropriate to proactively increase the capacity of such network link 430 between 9:00 am through 5:00 pm Monday through Friday and/or decrease the capacity of such network link 430 between 5:00 pm Friday and 9:00 am the following Monday.

In addition to reactively and/or proactively varying the capacity (adapting the rate) of one or more of the variable bit-rate network links 430 in the front-haul of each RRH 120 in response to UE load demands, it will be appreciated even if the UE loading profile of the RRHs 120 does not substantially change over time, the frequency-domain samples exchanged between the BBH 110 and an RRH 120 may from time to time take a different routing along the front-haul network 400. Such routing changes may also cause the capacity of a given network link 430 to be varied either reactively or proactively.

Furthermore, especially in a SDN-capable front-haul network 400, the topology of the front-haul network 400 itself may be varied from time to time. Such topology changes may impact the identity and/or number of RRHs 120 supported by a given network link 430 in the front-haul network 400, which in turn may impact the capacity demands imposed upon such network link 430.

Still further, especially in an NFV-capable front-haul network 400, the network functionality in a VNF (whether to support the front-haul capability or otherwise) that may from time to time be assigned to a PoP coupled directly or indirectly to a given network link 430, may be varied, which may impact the amount of traffic that will be carried across such network link 430.

Accordingly, it will be appreciated that there are a multiplicity of factors and data that is processed to determine the front-haul capacity of each of the network links 430 in the front-haul network 400. For this reason, the front-haul network 400 is provided with a front-haul controller 460 to reactively and/or proactively vary the bit-rate of the network links 430.

Figure 6:
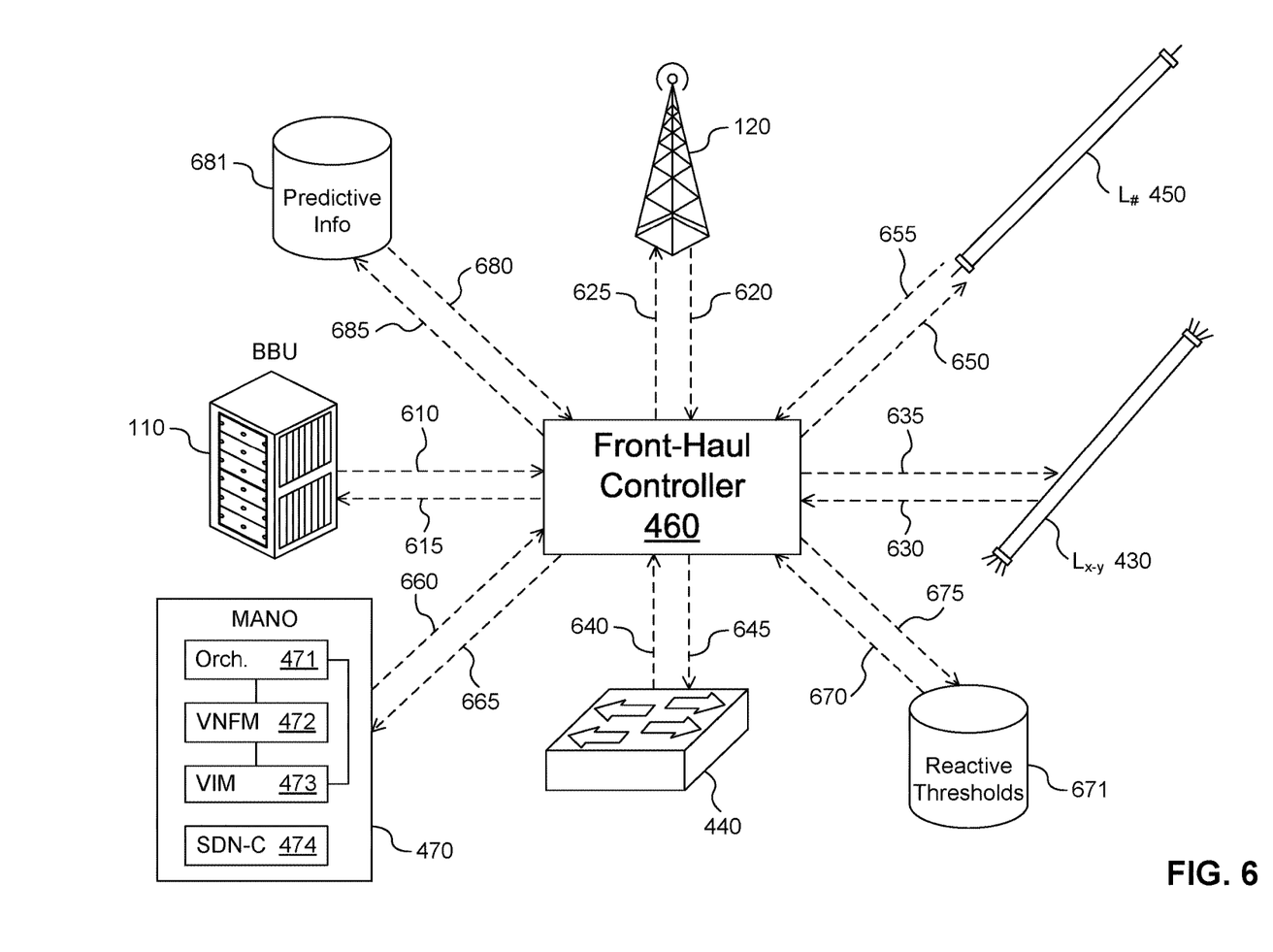
FIG. 6 is a block diagram showing the front-haul controller of FIG. 4 and control inputs and outputs with other components in the network thereof.

As shown in FIG. 4 and shown in greater detail in FIG. 6, the front-haul controller 460 exchanges control information along control links (shown as dashed lines) coupled, whether directly or indirectly to each of the network links 430, nodes, and RRH 120, as well as the BBU 110 to monitor information about wireless spectrum occupancy at the RRHs 120. In some examples, the front-haul controller 460 is coupled, whether directly or indirectly to each of the terminal links 450 between an RRH 120 and a node 440, especially if the terminal link 450 is also bit-rate adjustable. In some examples, the front-haul controller 460 is coupled, whether directly or indirectly to the (MANO) module 470, including the SDN-C 474. The front-haul controller 460 is coupled to one or more databases 671, 681 to monitor information about spectrum occupancy thresholds.

In some examples, the front-haul controller 460 operates in the control plane. In some examples, the front-haul controller 460 may comprise a PoP onto which network functionality may be downloaded from a cloud resource to instantiate a VNF. In some examples, the front-haul controller 460 may form part of the BBU 110.

As may be better seen in FIG. 6, the front-haul controller 460 accepts control inputs 610 from the BBU 110. Such control inputs 610 may include information regarding which RRH 120 is to receive front-haul traffic in the form of packets of frequency-domain samples. In some examples, such information may comprise statistical multiplexing data such as the curves shown in FIG. 3. In some examples, such information may comprise a request for an amount of capacity for a given network link 430. In some examples, instead of such a request, such information may comprise information from which such a request may be determined by the BBU 110. In some examples, the control inputs 610 may include statistics about packet loss and/or delay.

In some examples, the front-haul controller 460 generates control outputs 615 that it provides to the BBU 110. Such control outputs 615 may include acknowledgements of the receipt of information and/or requests from the BBU 110.

The front-haul controller 460 also accepts control inputs 620 from each RRH 120. Such control inputs 620 include information about the success and/or failure of changes to the capacity of the front-haul of the RRH 120 through changes to the capacity of the underlying network links 430. In some examples, the control inputs 620 may comprise statistics about packet usage of the RRH 120 and/or any loss or delay incurred.

The front-haul controller 460 also accepts control inputs 630 from each network link 430. Such control inputs 630 include information about the current load capacity allocated to the network link 430.

The front-haul controller 460 also accepts control inputs 640 from each node 440. Such control inputs 640 include information about any other VNFs instantiated thereon and any traffic constraints imposed by such other VNFs. In some examples, such information may include the size and/or number of packets sent across the network link 430 by the node 440. In some examples, such information may include a loading of the node 440.

In some examples, the front-haul controller 460 generates control outputs 645 that it provides to one or more nodes 440. Such control outputs 645 may include information to alert the node 440 that congestion is possible on the network links 430 and downstream nodes 440 that make up the front-haul for a downstream RRH 120. In such example, the node 440 may react by limiting a number of UEs supported by such RRH 120 (reducing the UE density) and/or by limiting the bandwidth provided for communications between such RRH 120 and the UE(s).

In some examples, especially if they are also capable of having their bit-rate varied, the front-haul controller 460 may also accept control inputs 650 from each terminal link 450. Such control inputs 650 may include information about the current load capacity allocated to the terminal link 450.

In some examples, the front-haul controller 460 also accepts control inputs 660 from and/or control outputs 665 to the MANO 470, including without limitation, the SDN-C 474 to facilitate communications with any intermediate networking gear. Such control inputs 660 may include information about the topology of the nodes 440 and the network links 430 coupling pairs of nodes 440. In some examples, the control inputs 660 include information about the terminal links 450 and which RRHs 120 and which nodes 440 are coupled thereby.

In some examples, the front-haul controller 460 generates control outputs 665 that it provides to the MANO 470. In some examples, such control outputs 665 may permit the front-haul controller 460 to alert the MANO 470 that one or more nodes 440 is resource-constrained by the network links 430 and downstream nodes 440 that make up the front-haul for a downstream RRH 120. In such example, the MANO 470 may react by instantiating more nodes 440 or by freeing up other resources.

The front-haul controller 460 also accepts control inputs 670 from a database of thresholds 671. As previously discussed, the front-haul controller 460 may vary the bit-rate of one or more network links 430 in reaction to changes in the network. Such changes can include, without limitation, changes in the RF spectrum occupancy, UE attachment and removal processes, UE state machine status and/or UE hand-off processes. Such information may be obtained by the front-haul controller from the packet core that may be running in the nodes 440, in the LTE or 5G control plane.

RF spectrum occupancy changes relate to the RF spectrum occupancy of each RRH 120 to support its associated UE(s), such as may be disclosed by one or more of the BBU 110 along control input 610, the RRHs 120 along control input 620, the node links 430 along control input 630 and/or the nodes 440 along control input 640. RF spectrum occupancy may be monitored in terms of both of the identify of and number of sub-carriers used and the loading, that is, the volume of data, of each sub-carrier.

UE attachment and removal and UE hand-off process changes relate to the number and identity of UE(s) that are supported by a given RRH 120, such as may be disclosed by the RRHs 120 along control input 620. As a general rule, an increase in the UE load of an RRH 120 would be reflected in an increase in the bandwidth on the front-haul supporting such RRH 120.

Further, at various points in time, a UE may be in an idle state, during which, as a general rule, the bandwidth on the front-haul supporting an RRH 120 to which such idle UE is attached may be reduced. Consequently, knowledge by the BBU 110 of UE state machine status changes may permit adjustment of the front-haul bandwidth accordingly.

While theoretically, the front-haul controller 460 could vary the bit-rate of each of the network links 430 in direct response to an instantaneous network change, in practice, one or more thresholds is specified because of the inherent delay in activation (provisioning) and/or deactivation (deprovisioning) of optical links and to reduce control churn. Such thresholds may be maintained in the database of thresholds 671 and made available to the front-haul controller 460 by control input 670.

Thus, if the network changes cause the RF spectrum occupancy of a network link 430 to exceed a threshold level, the bit-rate allocated to such network link 430 may be increased.

In some examples, if the network changes cause the RF spectrum occupancy of a network link 430 to fall below a threshold level, the bit-rate allocated to such network link 430 may be decreased.

In some examples, a manner of hysteresis may be obtained to reduce the likelihood that a bit-rate increase is immediately or shortly thereafter followed by a bit-rate decrease, by maintaining two sets of thresholds. The first set of thresholds specifies levels at which the allocated bit-rate should be increased. The second set of thresholds specifies levels at which the allocated bit-rate should be decreased and tends to be set lower than the thresholds in the first set.

In some examples, the thresholds may be independently specified for different network links 430 or groups of network links. In some examples, one or more of the thresholds may be varied from time to time by the front-haul controller 460 along control output 675.

The front-haul controller 460 also accepts control inputs 680 from a database of predictive information 681. As previously discussed, in addition to varying the bit-rate of network links 430 reactively, the front-haul controller 460 may vary the bit-rate allocated to one or more network links 430 proactively or predicatively in response to temporal information. The front-haul controller 460 obtains this temporal information along control input 680. In some examples, the front-haul controller 460 may update some or all of this temporal information along control output 685.

In some examples, the temporal information may be in the form of one or more of dates, days of the week and/or time ranges during which certain events will occur, along with a description of the nature and/or the geographic location of the event, from which the front-haul controller 460 is expected to derive a set of bit-rate capacities to be allocated to one or more of the network links 430.

In some examples, the derivation of the bit-rate capacities and the corresponding network links 430 may be performed a priori, in which case the temporal information may be in the form of a date and/or time range, the derived bit-rate capacity and the associated network links 430.

In some examples, the temporal information comprises a history of the bit-rate capacity allocation and/or load of each network link 430, which is updated from time to time by the front-haul controller 460 along control link 685 and accessed for use by the front-haul controller 460 along control link 680. In some examples, the history comprises the RF spectrum occupancy of each RRH 120 for every interval $T_k$ each having a duration of T seconds, assuming that there are K intervals within a day (or other macro time period).

In some examples, the front-haul controller 460 predicts the spectrum occupancy for each RRH 120 for the following day (or other macro time period) using the collected RF spectrum occupancies for each of the K intervals and a current smoothed spectrum occupancy in accordance with:

$$XS_k = \alpha XS_k + (1-\alpha)X_k \quad (1)$$

where $XS_k$ is the current smoothed spectrum occupancy;
$X_k$ is the collected spectrum occupancy; and
$\alpha$ is a constant smoothing fraction.

In some examples, the derived current smoothed spectrum occupancy for a network link 430 may be compared against one or more thresholds in the threshold database 671 so that if it exceeds a threshold level, the bit-rate allocated to such network link 430 may be increased, and/or if it falls below a threshold level, the bit-rate allocated to such network link 430 may be decreased.

In some examples, the threshold(s) used for the predictive adaptation are different than the threshold(s) used for the reactive adaptation. In some examples, the same threshold(s) may be used.

Armed with the foregoing, the front-haul controller 460 generates control outputs 635 to each network link 430. Such control outputs 635 include directives to vary (increase and/or decrease) the current load capacity, in terms of a bit-rate, allocated to the network link 430.

In some examples, especially if they are also capable of having their bit-rate varied, the front-haul controller 460 may generate control outputs 655 to each terminal link 450. Such control outputs 655 may include directives to vary (increase and/or decrease) the current load capacity, in terms of a bit-rate, allocated to the terminal link 450.

Method Actions

Figure 7:
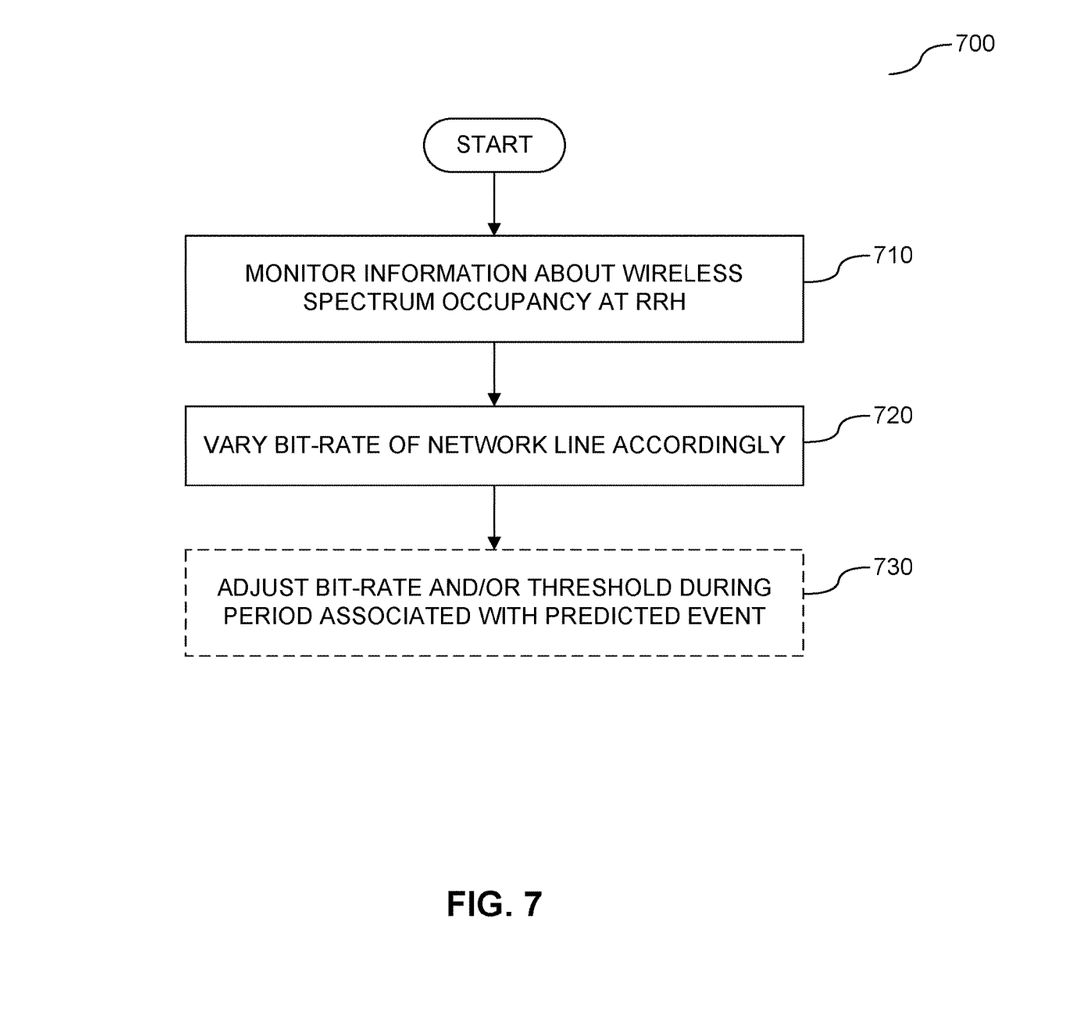
FIG. 7 is a flow chart showing method actions according to an example.

Turning now to FIG. 7, there is shown a flow chart, shown generally at 700, showing example actions taken by front-haul controller 460 in a method for controlling the exchange of front-haul information between the BBU 110 and at least one RRH 120.

One example action 710 is to monitor information about wireless spectrum occupancy at the RRH 120.

One example action 720 is to vary a bit-rate of a network link 430 in accordance therewith.

One example action 730 may be to adjust the bit-rate and/or the threshold during a period associated with a predicted event.

Example Device

Having described in detail example embodiments that are in accordance with the present disclosure, it is noted that the embodiments reside primarily in combinations of apparatus or devices and processing actions related to interactions between one or more of such components.

Figure 8:
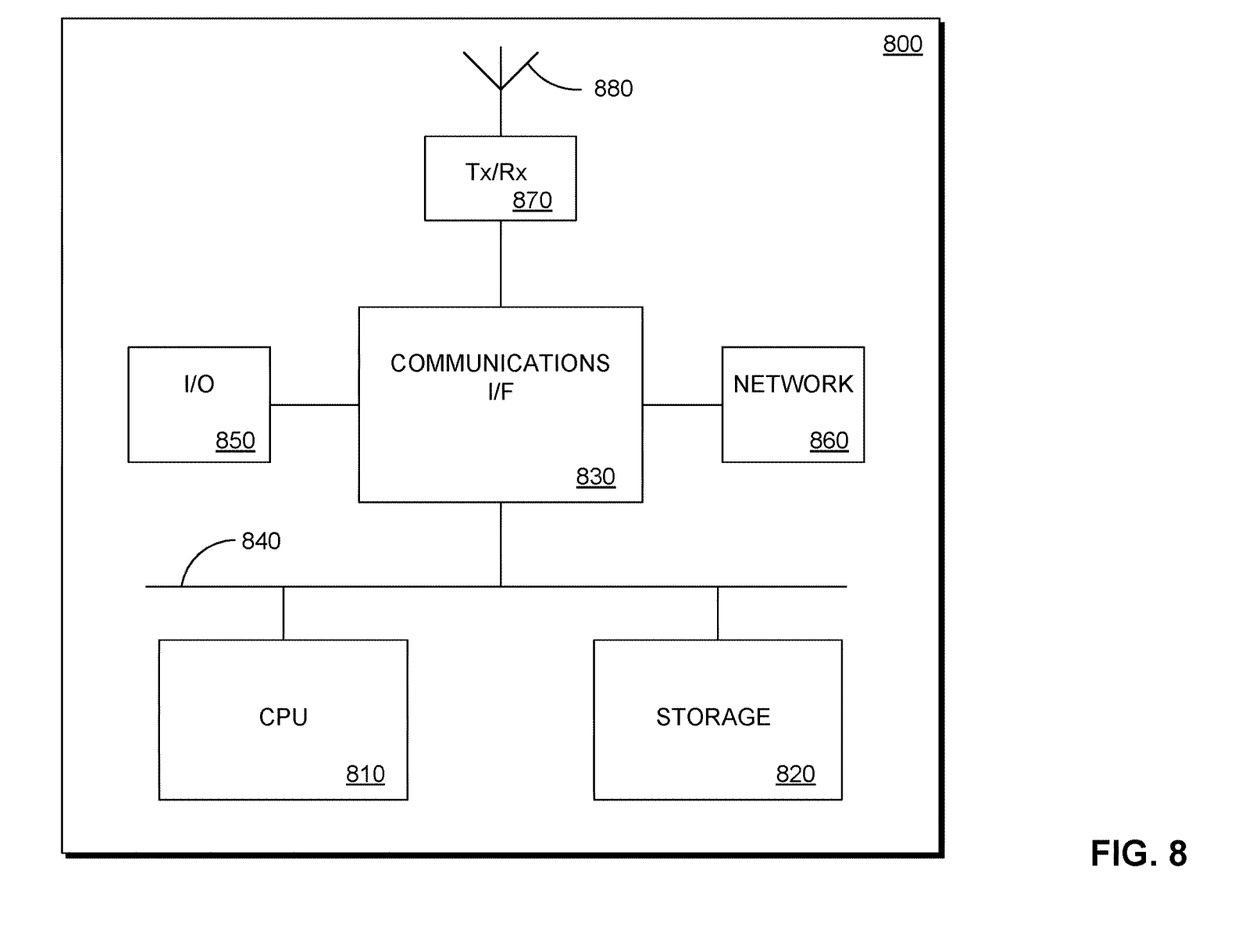
FIG. 8 is a block diagram of a processing system according to an example.

FIG. 8 is a block diagram of a processing system that may be used for implementing one or more devices, shown generally at 800, such as the front-haul controller 460, the BBU 110, an RRH 120, a node 440 and/or the MANO 470 and/or components thereof, for performing actions in one or more of the methods disclosed herein.

The device 800 comprises a processing unit 810, a storage medium 820 and a communications interface 830. In some example embodiments, the device 800 may also comprise a processing bus 840 interconnecting some or all of these components, as well as other devices and/or controllers. In some examples, the device 800 may comprise an input/output (I/O) device 850, a network connectivity device 860, a transceiver 870 and/or an antenna 880.

The processing unit 810 controls the general operation of the device 800, by way of non-limiting example, by sending data and/or control signals to the communications interface 830, and by retrieving data and/or instructions from the storage medium 820 to execute method actions disclosed herein.

However configured, the hardware of the processing unit 810 is configured so as to be capable of operating with sufficient software, processing power, memory resources and network throughput capability to handle any workload placed upon it.

The storage medium 820 provides storage of data used by the device 800, as described above. The storage medium 820 may also be configured to store computer codes and/or code sequences, instructions, configuration information, data and/or scripts in a computer program residing on or in a computer program product that, when executed by the processing unit 810, causes the processing unit 810 to perform one or more functions associated with the device 800, as disclosed herein.

The communications interface 830 facilitates communication with the I/O device(s) 850, network connectivity device(s) 860 and/or other entities in a communications network. In some example embodiments, the communications interface 830 is for connection to a transceiver 870, which may comprise one or more transmitters and/or receivers, and at least one antenna 880, through which is such communications are effected. As such, the communications interface 830 may comprise one or more interfaces and a suitable number of ports, to couple internal and external I/O devices 850, network connectivity devices 860 and the like to the processing unit 810.

Network connectivity devices 860 may enable the processing unit 810 to communicate with the internet or one or more intranets (not shown) to communicate with remote devices, for data processing and/or communications. The network connectivity devices 860 may also comprise and/or interface with one or more transceivers 870 for wirelessly or otherwise transmitting and receiving signals. With such a network connection, it is contemplated that the processing unit 810 may receive information from the network or might output information to the network in the course of performing one or more of the above-described method actions.

The transceiver 870 operates to prepare data to be transmitted and/or to convert received data for processing by the processing unit 810.

Other components, as well as related functionality of the device 800, may have been omitted in order not to obscure the concepts presented herein.

Terminology

The terms "including" and "comprising" are used in an open-ended fashion, and thus should be interpreted to mean "including, but not limited to". The terms "example" and "exemplary" are used simply to identify instances for illustrative purposes and should not be interpreted as limiting the scope of the invention to the stated instances. In particular, the term "exemplary" should not be interpreted to denote or confer any laudatory, beneficial or other quality to the expression with which it is used, whether in terms of design, performance or otherwise.

The terms "couple" and "communicate" in any form are intended to mean either a direct connection or indirect connection through some interface, device, intermediate component or connection, whether electrically, mechanically, chemically, or otherwise.

Directional terms such as "upward", "downward", "left" and "right" are used to refer to directions in the drawings to which reference is made unless otherwise stated. Similarly, words such as "inward" and "outward" are used to refer to directions toward and away from, respectively, the geometric center of the device, area or volume or designated parts thereof. Moreover, all dimensions described herein are intended solely to be by way of example for purposes of illustrating certain embodiments and are not intended to limit the scope to any embodiments that may depart from such dimensions as may be specified.

References in the singular form include the plural and vice versa, unless otherwise noted.

As used herein, relational terms, such as "first" and "second", and numbering devices such as "a", "b" and the like, may be used solely to distinguish one entity or element from another entity or element, without necessarily requiring or implying any physical or logical relationship or order between such entities or elements.

General

All statements herein reciting principles, aspects and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated that the present disclosure, which is described by the claims and not by the implementation details provided, which can be modified by omitting, adding or replacing elements with equivalent functional elements, provides many applicable inventive concepts that may be embodied in a wide variety of specific contexts. The specific examples discussed are merely illustrative of specific ways to make and use the disclosure, and do not limit the scope of the present disclosure. Rather, the general principles set forth herein are considered to be merely illustrative of the scope of the present disclosure.

It will be apparent that various modifications and variations covering alternatives, modifications and equivalents will be apparent to persons having ordinary skill in the relevant art upon reference to this description and may be made to the examples disclosed herein, without departing from the present disclosure, as defined by the appended claims.

Accordingly the specification and the examples disclosed therein are to be considered examples only, with a true scope of the disclosure being disclosed by the following numbered claims:

What is claimed is:

1. A front-haul controller for:
   receiving, from at least one front-haul processor, information about wireless spectrum occupancy of at least one wireless transceiver coupled to the at least one front-haul processor by a network of nodes;
   comparing the information with at least one spectrum occupancy threshold; and
   transmitting an instruction, in accordance with the comparison of the information and the threshold, to the at least one front-haul processor to vary a bit-rate of at least one variable bit-rate link in the network, by which at least one packet is exchanged between the at least one front-haul processor and the at least one wireless transceiver.

2. The front-haul controller according to claim 1, wherein the link is at least one of a flexible Ethernet (FlexE) link, synchronous optical networking (SONET) link, dense wavelength division multiplexing (DWDM) link, link aggregation (LAG) link and/or equal cost multi path (ECMP) link.

3. The front-haul controller according to claim 1, wherein the front-haul controller proactively adjusts at least one of the bit-rate and the threshold during at least one period associated with at least one predicted event that may impact the spectrum occupancy.

4. The front-haul controller according to claim 1, wherein the information comprises statistical multiplexing data.

5. The front-haul controller according to claim 1, wherein the information is related to at least one of the packets across the link, a density of devices supported by the transceiver, a topology of the nodes coupled by the link and a loading of the nodes coupled by the link.

6. The front-haul controller according to claim 1, wherein it is part of the front-haul processor.

7. The front-haul controller according to claim 1, wherein the front-haul processor comprises a broadband unit (BBU).

8. The front-haul controller according to claim 1, wherein the front-haul processor is coupled to and exchanges packets with a plurality of transceivers.

9. The front-haul controller according to claim 1, wherein the transceiver comprises a remote radio head (RRH) located proximate to an RF antenna.

10. The front-haul controller according to claim 1, wherein the at least one packet is exchanged during the communication of at least one RF analog signal between the at least one wireless transceiver and at least one wireless device supported thereby.

11. The front-haul controller according to claim 10, wherein the at least one wireless device comprises a user equipment (UE).

12. The front-haul controller according to claim 10, wherein the at least one wireless device is supported by a plurality of transceivers.

13. The front-haul controller according to claim 10, wherein the network supports communications unrelated to supporting exchange of front-haul information for communication with the at least one wireless device between the front-haul processor and the transceiver.

14. The front-haul controller according to claim 1, wherein at least one of the nodes in the network comprises a point of presence (PoP) onto which network functionality is downloaded to form a virtual network function (VNF).

15. The front-haul controller according to claim 14, wherein the network functionality supports exchange between the at least one front-haul processor and the at least one transceiver of front-haul information for communication with a wireless device supported by the at least one transceiver.

16. The front-haul controller according to claim 1, wherein the at least one packet has a variable length.

17. The front-haul controller according to claim 1, wherein the at least one packet omits at least one sample associated with at least one subcarrier that is not used by the transceiver.

18. The front-haul controller according to claim 1, wherein the at least one packet comprises at least one frequency-domain sample.

19. The front-haul controller according to claim 1, wherein the variable bit-rate link couples a plurality of the nodes in the network.

20. A method of exchanging packets between at least one front-haul processor and at least one wireless transceiver across a network of nodes, comprising actions at a front-haul controller of:
receiving information about wireless spectrum occupancy of the at least one transceiver;
comparing the information with at least one spectrum occupancy threshold; and
transmitting an instruction, in accordance with the comparison of the information and the threshold, to the at least one front-haul processor to vary a bit-rate of at least one variable bit-rate link in the network, by which at least one packet is exchanged between the at least one front-haul processor and the at least one transceiver.

21. The method according to claim 20, wherein the action of comparing comprises proactively adjusting at least one of the bit-rate and the threshold during at least one period associated with at least one predicted event that may impact the spectrum occupancy.

22. A first node having a processor and a memory containing a front-haul controller software module for execution by the processor that causes the node to exchange at least one packet between at least one front-haul processor and at least one wireless transceiver across a network of nodes, by:
receiving, from the at least one front-haul processor, information about wireless spectrum occupancy of the at least one transceiver;
comparing the information with at least one spectrum occupancy threshold; and
transmitting an instruction, in accordance with the comparison of the information and the threshold, to the at least one front-haul processor to vary a bit-rate of at least one variable bit-rate link in the network, by which at least one packet is exchanged between the at least one front-haul processor and the at least one wireless transceiver.

23. The first node according to claim 22, wherein the front-haul controller software module causes the first node to proactively adjust at least one of the bit-rate and the threshold during at least one period associated with at least one predicted event that may impact the spectrum occupancy.

* * * * *